United States Patent [19]

Kokubu

[11] Patent Number: 4,868,758
[45] Date of Patent: Sep. 19, 1989

[54] DATA COMMUNICATION SYSTEM
[75] Inventor: Nobuaki Kokubu, Tokyo, Japan
[73] Assignee: Canon Kabushiki Kaisha, Tokyo, Japan
[21] Appl. No.: 9,528
[22] Filed: Feb. 2, 1987
[30] Foreign Application Priority Data Feb. 8, 1986 [JP] Japan .................................. 61-026277

[51] Int. Cl.$^4$ .................... H04M 15/00; H04N 1/419; G06F 15/20
[52] U.S. Cl. ............................ 364/464.01; 358/261.1; 379/114; 379/131
[58] Field of Search ............................ 358/261, 261.1; 364/464, 464.01; 370/43, 44; 375/8; 379/114, 131

[56] References Cited

U.S. PATENT DOCUMENTS

| | | | |
|---|---|---|---|
| 3,898,373 | 8/1975 | Walsh | 364/200 X |
| 4,041,291 | 8/1977 | Pavda | 379/131 X |
| 4,122,308 | 10/1978 | Weinberger et al. | 379/114 X |
| 4,151,562 | 4/1979 | Tregay | 358/261 X |
| 4,297,727 | 10/1981 | Ogawa et al. | 358/261 |
| 4,386,416 | 5/1983 | Giltner et al. | 364/900 |
| 4,470,073 | 9/1984 | Nakamura et al. | 358/261 |
| 4,585,904 | 4/1986 | Mincone et al. | 379/112 X |
| 4,665,519 | 5/1987 | Kirchner et al. | 375/8 X |
| 4,751,728 | 6/1988 | Treat | 379/114 X |
| 4,791,665 | 12/1988 | Bogart et al. | 379/197 X |
| 4,796,293 | 1/1989 | Blinken et al. | 379/130 X |

Primary Examiner—Parshotam S. Lall
Assistant Examiner—Edward R. Cosimano
Attorney, Agent, or Firm—Fitzpatrick, Cella, Harper & Scinto

[57] ABSTRACT

A data communication system comprises calculation means for calculating a communication charge to be charged when a given amount of data is to be transmitted, and display means for displaying the calculated communication charge prior to the data transmission.

15 Claims, 2 Drawing Sheets

DATA COMMUNICATION SYSTEM

BACKGROUND OF THE INVENTION

1. Field of the Invention

The present invention relates to a data communication system for character code data and image data.

2. Related Background Art

In a facsimile machine or telephone set, it has been common to indicate a communication charge based on a time required for the communication after the completion of the data transmission or speech.

The prior art system indicates the communication charge after the communication and an operator cannot know a communication charge before he/she starts the communication.

SUMMARY OF THE INVENTION

It is an object of the present invention to improve a data communication system.

It is another object of the present invention to eliminate shortcomings of the prior art system.

It is another object of the present invention to inform a communication charge to an operator prior to data communication.

It is another object of the present invention to inform the communication charge prior to data communication based on amount of data to be communicated.

It is another object of the present invention to inform the communication charge prior to data communication based on amount of data stored in a memory.

Other objects of the present invention will be apparent from the following description of the embodiment.

DETAILED DESCRIPTION OF THE PREFERRED EMBODIMENT

Figure 1:
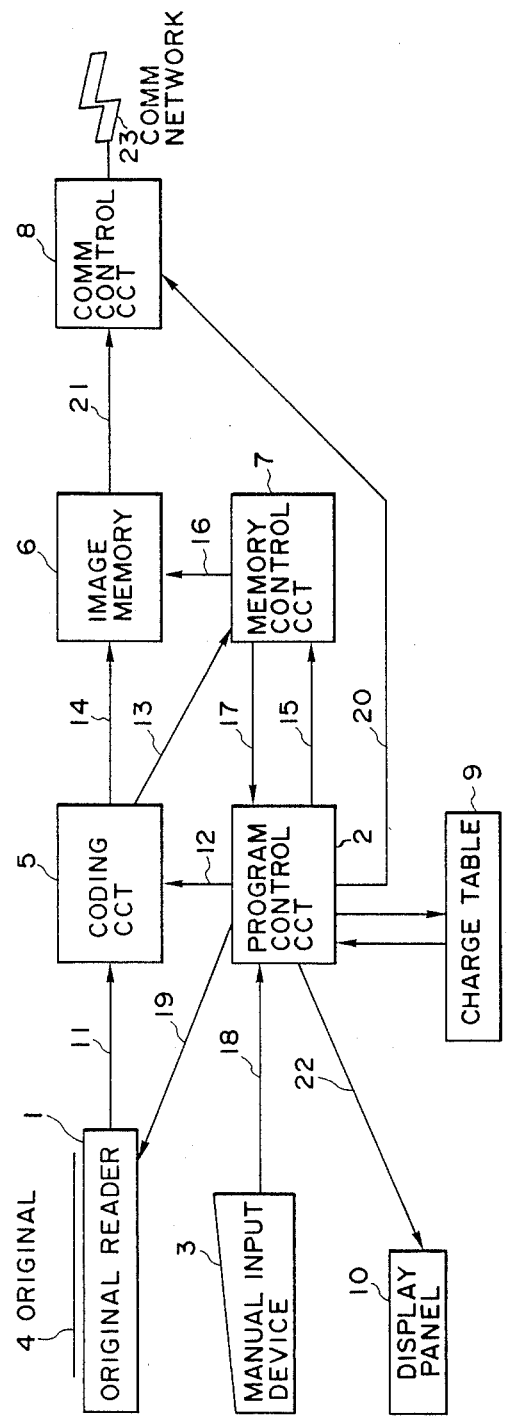
FIG. 1 shows a block diagram of a facsimile system in accordance with one embodiment of the present invention.

FIG. 1 shows a block diagram of a facsimile communication system in accordance with one embodiment of the present invention.

Numeral 1 denotes a document reader for reading a document 4. The document reader 1 comprises a CCD line sensor, a digitizing circuit and a motor for feeding the document sheet. It is a well-known document reader used in a conventional facsimile machine.

Numeral 2 denotes a program control circuit for controlling the overall facsimile system. The program control circuit 2 comprises a microprocessor and peripherals of the microprocessor such as a read-only memory (ROM), a random access memory (RAM) and I/O ports. A control program for the microprocessor is stored in the ROM.

Numeral 3 denotes a manual input device. It comprises a plurality of key input switches and a key input scan circuit, and supplies a detected key input signal to the program control circuit 2.

Numeral 5 denotes an encoder for encoding an image signal from the document reader 1. The encoding system of the encoder 5 may be the modified Huffman (MH), modified READ (MR) or modified READ (MMR). An amount of data to be transmitted when a given document is transmitted differs depending on the encoding system.

Numeral 6 denotes an image memory for storing the encoded image data.

Numeral 7 denotes a memory control circuit for controlling the image memory 6.

Numeral 8 denotes a communication control circuit for communicating data through a packet communication network 23.

Numeral 9 denotes a charge table in which communication charge information is stored.

In the present embodiment, it is assumed that a packet communication network is used as a communication network. In the packet communication network, the communication charge is determined depending on the amount of information transmitted, transmission speed and transmission distance. Therefore, the charge table 9 stores the communication charge information for the amount of information transmitted, transmission speed and transmission distance. In the present embodiment, the packet communication network is used, but if a public line network is used, the communication charge is determined by a transmission time (a time during which the line is occupied) and the transmission distance, and the transmission time is determined by the amount of information transmitted and the transmission speed.

Since the communication charge usually differs depending on a time at which the line is used, the charge table 9 stores the communication charge information for respective time frames.

Numeral 10 denotes a display panel on which the communication charge, transmission speed and other information are displayed. The display panel 10 may be a liquid crystal display or an LED. In the display panel 10 of the present embodiment, the charge is displayed as "CHARGE $XX".

The operation of the present embodiment is explained. The document reader 1 receives a command signal 18 from the manual input device 3 through a signal line 19 and the program control circuit 2 which comprises the microprocessor, ROM and RAM, and reads the document 4. The image information is supplied to the encoder 5 through a signal line 11, and it is encoded by the encoding method specified by the program control circuit 2 through a signal line 12. The encoder 5 supplies the coded image information to the image memory 6 through a signal line 14 and inform the start and end of the output of the coded information to the memory control circuit 7 through a signal line 13. The memory control circuit 7 receives an image write start address of the image memory 6 from the program control circuit 2 through a signal line 15, and controls the image memory 6 through a signal line 16 to store the coded information. After the coded information has been stored, the memory control circuit 7 informs the end address of the coded information stored in the program control circuit 2 through a signal line 17. When a plurality of document sheets are to be stored, the program control circuit 2 sets the next write start address to an address after the end address. In this manner, the coded image information stored in the image memory is always managed by the program control circuit.

On the other hand, if a send command is supplied from the manual input device to the program control circuit 2 through a signal line 18, the program control circuit 2 instructs to the memory control circuit 7 to read the data from the image memory through a signal line 15, and activates the communication control circuit 8 through a signal line 20. The communication control circuit 8 receives the image coded information from the image memory 6 through a signal line 21 and supplies it to the communication network 23 in a form acceptable by the communication network 23.

In the present embodiment shown in FIG. 1, the charge table 9 is connected to the program control circuit 2. The charge table 9 is a memory which stores communication charges for the information amount stored in the image memory 6, while taking the transmitted information amount into consideration. The charge table 9 may be a ROM contained in the program control circuit 2 or it may be loaded from an external magnetic storage. When the program control circuit 2 receives a "display charge" command from the manual input device 3, it requests to the manual input device 3 to supply parameters including the transmission distance and the transmission speed necessary to identify the communication charge to an operator by the display panel 10. When they are supplied, the program control circuit 2 calculates the communication charge by referring the charge table 9 and taking the parameters into consideration, and displays the communication charge on the display panel 10 through a signal line 22 to inform the communication charge to the operator.

Figure 2:
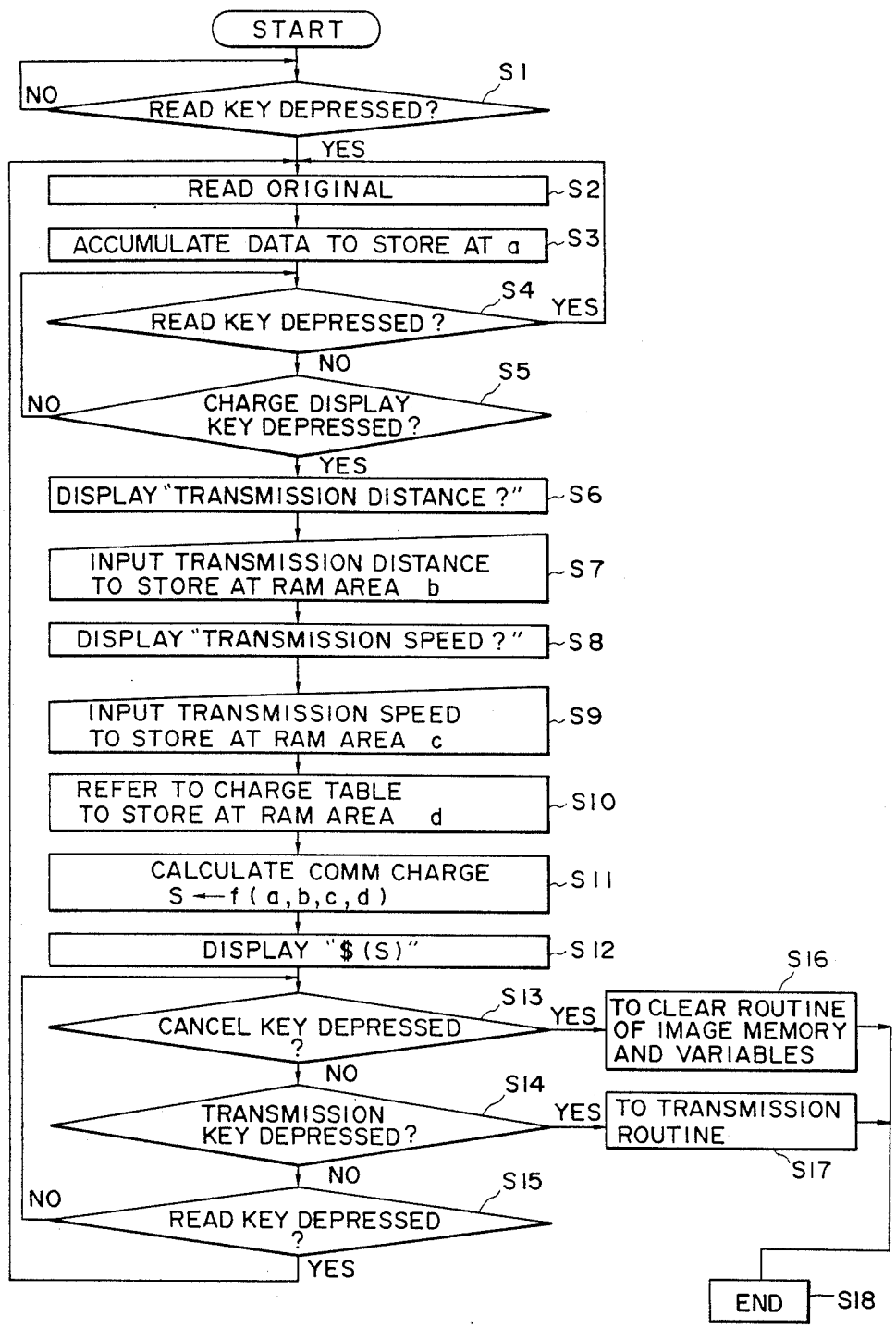
FIG. 2 shows a flow chart of a control operation by a program control circuit 2 of the embodiment.

FIG. 2 shows a flow chart of a control operation of the program control circuit 2 of the present embodiment.

In a step S1, whether a read key (not shown) of the manual input device 3 has been depressed or not is checked, and if the depression is detected, the process proceeds to a step S2 where the document is read by the document reader 1. Step S1 is repeated if the read key is not depressed. The image signal read by the document reader 1 is encoded by the encoder 5 in the specified coding system and sequentially stored into the image memory 6.

In a step S3, the amount of image information in the image memory 6 is accumulated in a counter a (in the program control circuit 2).

In a step S4, whether the read key has been depressed or not is checked, and if it has been depressed, the process returns to the step S2, and if it has not been depressed, the process proceeds to a step S5. In the step S4, instead of checking the depression of the read key, a document sensor may be provided in the document reader 1 to check the presence or absence of the next document.

In the step S5, whether a charge display key (not shown) of the manual input device 3 has been depressed or not is checked, and if it has been depressed, the process proceeds to a step S6, and if it has not been depressed, the process returns to the step S4.

In the step S6, an indication "TRANSMISSION DISTANCE?" to request input of the transmission distance is displayed. In a step S7, the operator inputs the transmission distance information through the manual input device 3. It is stored in the RAM area b of the program control circuit 2. For example, the operator inputs a telephone number of a destination station. The program control circuit 2 calculates a unit charge for the data communication with the destination station based on the input telephone number and the charge table. In steps S8 and S9, the transmission speed is inputted. The input data is stored in the RAM area c of the program control circuit 2.

In a step S10, the charge table 9 is looked up by the input transmission distance and transmission speed, and the looked-up data is stored in the RAM area d of the program control circuit 2. In a step S11, the communication charge S is calculated based on the data stored in the RAM areas a, b, c and d.

In a step S12, the communication charge S calculated in the step S11 is displayed on the display panel 10.

In a step S13, the depression of a cancel key (not shown) of the manual input device 3 is checked. If the cancel key is not depressed the operation proceeds to a step S14, and the depression of a transmission key (not shown) of the manual input device 3 is checked. If the transmission key is not depressed the operation proceeds to a step S15 and the depression of the read key is checked. If the depression of the cancel key is detected in the step S13, the process proceeds to a step S16 where the image memory 6 and the input variables are cleared and the process then proceeds to the end of process step S18. If the depression of the transmission key is detected in the step S14, the process proceeds to a transmission routine of a step S17. The process then proceeds to the end of process step, S18. If the depression of the read key is detected in the step S15, the process returns to the step S2 to read the next document. If the read key is not depressed, steps S13, S14 and S15 are repeated.

In accordance with the present embodiment, since the communication charge is displayed prior to the data transmission, the operator can increase or reduce the amount of data while he/she watches the charge.

In the present embodiment, the data is transmitted after the charge has been displayed. Alternatively, the communication charge may be selectively displayed. For example, in the step S5, if the charge display key is not depressed in a predetermined time period, the telephone number of the destination station and the transmission speed are inputted and the data is transmitted.

In the present embodiment, the transmission speed of the data communication is inputted. In the facsimile communication, the transmission speed is determined by a facsimile communication protocol prior to the data communication. Thus, the communication charge may be calculated based on the transmission speed determined by the communication protocol and the transmission distance to the destination station, and it may be displayed prior to the data communication.

While the facsimile system has been described in the embodiment, the present invention is not limited to the facsimile system but it may be applied to other data communication apparatus such as a teletex character code communication apparatus.

In accordance with the present invention, since the communication charge is calculated based on the fact that the amount of data stored in the memory of the data communication apparatus is known prior to the transmission and it is displayed on the display panel, the present invention offers the following advantages.

(1) The operator can know the communication charge prior to the transmission.

(2) The operator can cancel the transmission after he/she has known the communication charge.

(3) When the present invention is applied to a data communication system in which a transmission system can be selected from a plurality of compression methods or scan densities, the operator can select the transmission system by referring the communication charge.

I claim:

1. A data communication apparatus comprising:
   input means for inputting a predetermined amount of transmission data;
   recognition means for recognizing information representing the predetermined amount of transmission data;
   calculation means for calculating a communication charge in accordance with the information recognized by said recognition means;
   display means for visually displaying the communication charge in response to said calculation means; and
   transmission means for transmitting the transmission data input by said input means after said display means displays the communication charge.

2. An apparatus according to claim 1, wherein said display means displays the communication charge on a display panel.

3. An apparatus according to claim 1, wherein said calculation means comprises a charge table for calculating the communication charge in accordance with the information recognized by said recognition means.

4. An apparatus according to claim 1, further comprising selection means for selecting if the communication charge is to be displayed by said display means.

5. An apparatus according to claim 1, wherein said input means comprises reading means for reading an original document and output means for outputting image data representing an image of the original document.

6. An apparatus according to claim 1, wherein said recognition means comprises a memory means to store therein the transmission data and the information.

7. An apparatus according to claim 6, further comprising an encoding means for encoding the transmission data, wherein the encoded transmission data is stored in said memory means.

8. An apparatus according to claim 6, further comprising clearing means for clearing, prior to said transmission means transmitting the data, the transmission data stored in said memory.

9. A data communication apparatus comprising:
   reading means for reading an original document as image data;
   encoding means for encoding the image data from said reading means in a predetermined coding system;
   memory means for storing therein the image data encoded by said encoding means;
   transmission means for transmitting the image data stored in said memory means;
   detection means for detecting an amount of the stored image data to be transmitted by said transmission means;
   calculation means for calculating a communication charge when said transmission means transmits the image data stored in said memory means, in accordance with the amount of the image data detected by said detection means; and
   display means for displaying the communication charge calculated by said calculation means prior to said transmission means transmitting the image data.

10. An apparatus according to claim 9, wherein said calculation means comprises a charge table storing charges for various amounts of the image data, for calculating the communication charge.

11. An apparatus according to claim 9, wherein said transmission means transmits the image data to a destination station at a transmission distance and said calculation means calculates a transmission time required for transmitting the image data in response to the amount of the image data detected by said detecting means and calculates the communication charge based on the transmission time and the transmission distance.

12. An apparatus according to claim 9, wherein said display means visually displays the communication charge on a display panel.

13. A data communication apparatus comprising:
    data communication means for communicating a predetermined amount of data using a plurality of communication modes;
    calculation means for calculating, prior to said data communication means communicating the data, a communication charge in accordance with the predetermined amount of data and the communication modes;
    memory means for storing the communication charge, wherein said memory means is accessed in accordance with the communication modes and the amount of data; and
    display means for displaying the communication charge calculated by said calculation means prior to said data communications means communicating said data.

14. An apparatus according to claim 13, wherein said plurality of communication modes includes communication speed and communication distance.

15. An apparatus according to claim 13, further comprising input means for inputting image data and an image memory for storing the image data wherein said image data is communicated by said data communication means and the amount of data is calculated from the data stored in said image memory.

* * * * *